US009836697B2

(12) United States Patent
Tsitkin et al.

(10) Patent No.: US 9,836,697 B2
(45) Date of Patent: Dec. 5, 2017

(54) DETERMINING VARIABLE OPTIMAL POLICY FOR AN MDP PARADIGM

(71) Applicant: International Business Machines Corporation, Armonk, NY (US)

(72) Inventors: Alexey Tsitkin, Petach Tikva (IL); Segev E Wasserkrug, Haifa (IL); Alexander Zadorojniy, Haifa (IL); Sergey Zeltyn, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 14/506,698

(22) Filed: Oct. 6, 2014

(65) Prior Publication Data
US 2016/0098642 A1 Apr. 7, 2016

(51) Int. Cl.
*G06F 7/60* (2006.01)
*G06F 17/10* (2006.01)
*G06N 7/00* (2006.01)

(52) U.S. Cl.
CPC .................... *G06N 7/005* (2013.01)

(58) Field of Classification Search
CPC ...................................................... G06N 7/005
(Continued)

(56) References Cited

U.S. PATENT DOCUMENTS 8,024,611 B1* 9/2011 Meek .................. G06F 11/0709
706/45
8,250,014 B2 8/2012 Schneegaβ et al.
(Continued)

OTHER PUBLICATIONS

Staudigl, Mathias., "A limit theorem for Markov decision processes", Working Papers, Center for Mathematical Economics (IMW), Bielefeld University, Feb. 20, 2013.
Niese, N.D. et al..,"Strategic life cycle decision-making for the management of complex Systems subject to uncertain environmental policy", Ocean Engineering, vol. 72, Nov. 1, 2013, pp. 365-374.
Justin A. Boyan., "Exact solutions to time-dependent MDPs", Advances in Neural Information Processing Systems, 55-4 self, 2000.

(Continued)

*Primary Examiner* — Timothy A Mudrick

(57) ABSTRACT

A method for determining a variable near-optimal policy for a problem formulated as Markov Decision Process, the problem comprising at least one limited action entry, the limited action entry being an entry of an action of a finite set of actions limited in the number of times its value may be changed, the method comprising using at least one hardware processor for: receiving data elements with respect to the problem, the data elements comprising: (a) a finite set of states, (b) the finite set of actions, (c) a transition probabilities matrix determining transition probabilities between states of the finite set of states, once actions of the set of actions are performed; (d) an immediate cost function, wherein the value of the immediate cost function is determined for a pair of a state of the finite set of states and an action of the finite set of actions, and (e) a discount factor; updating one or more data elements of the received data elements relating to the at least one limited action entry, wherein the one or more data elements are selected from the group consisting of: the transition probabilities matrix, the immediate cost function and the discount factor, and wherein the updating is triggered by a change of a value of a limited action entry of the at least one limited action entry; and following the updating of the one or more data elements, calculating a current near-optimal policy for the problem based on the updated one or more data elements.

20 Claims, 2 Drawing Sheets

(58) Field of Classification Search
USPC .......................................................... 703/2
See application file for complete search history.

(56) References Cited

U.S. PATENT DOCUMENTS

| | | | |
|---|---|---|---|
| 8,417,554 B2 | 4/2013 | Agarwal et al. | |
| 8,452,639 B2 | 5/2013 | Abe et al. | |
| 2003/0220772 A1* | 11/2003 | Chiang | G06F 17/12 703/2 |
| 2009/0271340 A1* | 10/2009 | Schneegass | G05B 13/0265 706/12 |
| 2009/0306866 A1 | 12/2009 | Malikopoulos | |
| 2014/0279737 A1* | 9/2014 | Horvitz | G06N 99/005 706/12 |

OTHER PUBLICATIONS

Peng Dai., "Topological Value Iteration Algorithm for Markov Decision Processes", Proceeding IJCAI'07 Proceedings of the 20th international joint conference on Artifical intelligence, pp. 1860-1865, 2007.

Saucedo, V.M. et al., "Experimental optimization of a real time fed-batch fermentation process using Markov decision process", Biotechnology & Bioengineering, 55 (2): 317-327, 1997.

Sean P. Meyn, "The policy iteration algorithm for average reward Markov decision processes with general state space", IEEE Transactions on Automatic Control, vol. 42, No., pp. 1663-1680 Dec. 12, 1997.

* cited by examiner

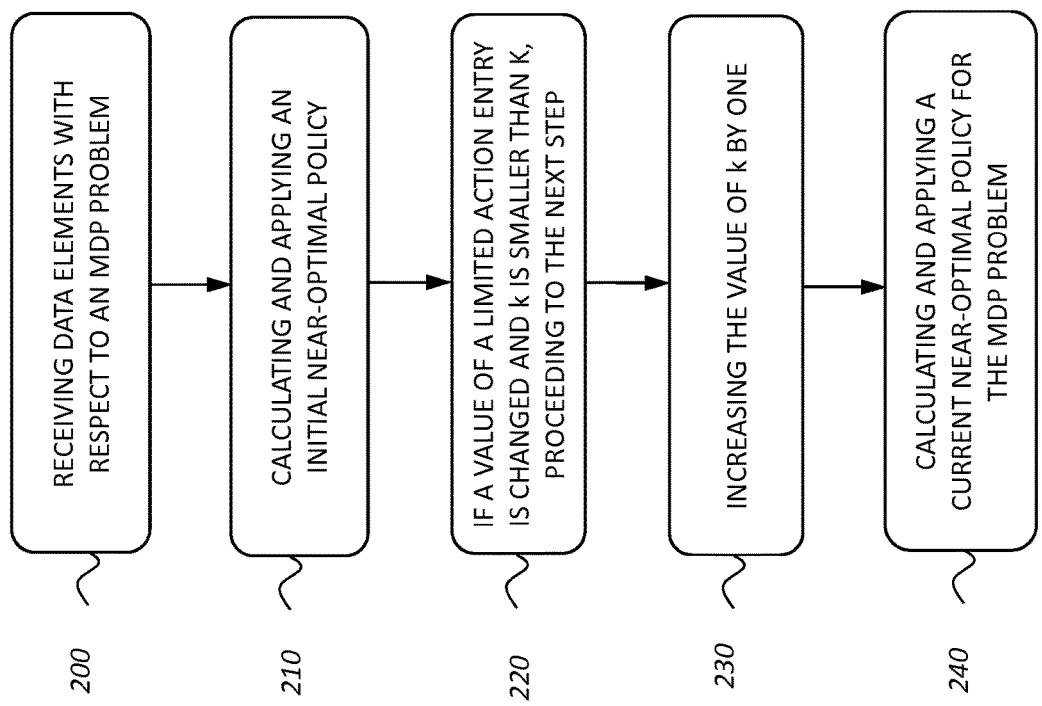

DETERMINING VARIABLE OPTIMAL POLICY FOR AN MDP PARADIGM

BACKGROUND

The present invention relates to the field of optimization problems.

Markov Decision Processes (MDPs) are extensively analyzed in the literature. However, when MDPs are applied to real life problems there may be additional requirements which are typically not analyzed. For instance, when optimization is applied for long time intervals it is convenient to model the problem as infinite horizon. However, there might be a notion of time, which is important for the real life problems that one may be interested in solving, which is typically disregarded in infinite horizon problems.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method for determining a variable near-optimal policy for a problem formulated as Markov Decision Process, the problem comprising at least one limited action entry, the limited action entry being an entry of an action of a finite set of actions limited in the number of times its value may be changed, the method comprising using at least one hardware processor for: receiving data elements with respect to the problem, the data elements comprising: (a) a finite set of states, wherein each state of the states comprises state entries, (b) the finite set of actions, wherein each action of the actions comprises action entries, (c) a transition probabilities matrix determining transition probabilities between states of the finite set of states, once actions of the set of actions are performed; (d) an immediate cost function, wherein the value of the immediate cost function is determined for a pair of a state of the finite set of states and an action of the finite set of actions, and (e) a discount factor; updating one or more data elements of the received data elements relating to the at least one limited action entry, wherein the one or more data elements are selected from the group consisting of: the transition probabilities matrix, the immediate cost function and the discount factor, and wherein the updating is triggered by a change of a value of a limited action entry of the at least one limited action entry; and following the updating of the one or more data elements, calculating a current near-optimal policy for the problem based on the updated one or more data elements.

There is provided, in accordance with another embodiment, a computer program product for determining a variable near-optimal policy for a problem formulated as Markov Decision Process, the problem comprising at least one limited action entry, the limited action entry being an entry of an action of a finite set of actions limited in the number of times its value may be changed, the computer program product comprising a non-transitory computer-readable storage medium having program code embodied therewith, the program code executable by at least one hardware processor to: receive data elements with respect to the problem, the data elements comprising: (a) a finite set of states, (b) the finite set of actions, (c) a transition probabilities matrix determining transition probabilities between states of the finite set of states, once actions of the set of actions are performed; (d) an immediate cost function, wherein the value of the immediate cost function is determined for a pair of a state of the finite set of states and an action of the finite set of actions, and (e) a discount factor; update one or more data elements of the received data elements relating to the at least one limited action entry, wherein the one or more data elements are selected from the group consisting of: the transition probabilities matrix, the immediate cost function and the discount factor, and wherein the updating is triggered by a change of a value of a limited action entry of the at least one limited action entry; and following the updating of the one or more data elements, calculate a current near-optimal policy for the problem based on the updated one or more data elements.

There is provided, in accordance with a further embodiment, a system comprising at least one hardware processor configured to: receive data elements with respect to the problem, the data elements comprising: (a) a finite set of states, (b) the finite set of actions, (c) a transition probabilities matrix determining transition probabilities between states of the finite set of states, once actions of the set of actions are performed; (d) an immediate cost function, wherein the value of the immediate cost function is determined for a pair of a state of the finite set of states and an action of the finite set of actions, and (e) a discount factor; update one or more data elements of the received data elements relating to the at least one limited action entry, wherein the one or more data elements are selected from the group consisting of: the transition probabilities matrix, the immediate cost function and the discount factor, and wherein the updating is triggered by a change of a value of a limited action entry of the at least one limited action entry; and following the updating of the one or more data elements, calculate a current near-optimal policy for the problem based on the updated one or more data elements.

In some embodiments, the updating of the one or more data elements comprises updating the immediate cost function.

In some embodiments, the updating of the immediate cost function comprises increasing a value of the immediate cost function determined for the limited action entry, for the next time the value of the limited action entry is changed.

In some embodiments, the updating of the one or more data elements comprises updating the discount factor.

In some embodiments, the updating of the discount factor comprises increasing the discount factor with respect to the number of times remained to change the value of the limited action entry.

In some embodiments, the updating of the one or more data elements comprises updating the transition probabilities matrix.

In some embodiments, the updating of the one or more data elements comprises calculating a current value for the one or more data elements.

In some embodiments, the method further comprises using said at least one hardware processor for preventing the updating of the one or more data elements for a number of times which is beyond the number of times the value of the limited action entry may be changed.

In some embodiments, the discount factor is used to control a bounded gap of the calculated current near-optimal policy to optimality.

In some embodiments, said program code is further executable by said at least one hardware processor to prevent the updating of the one or more data elements for a number of times which is beyond the number of times the value of the limited action entry may be changed.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 2 shows a flowchart of an exemplary method for determining a variable near-optimal policy for an MDP problem with limitation of the number of times a value of an action entry may be changed, constructed and operative in accordance with an embodiment of the disclosed techniques.

DETAILED DESCRIPTION

Figure 1:
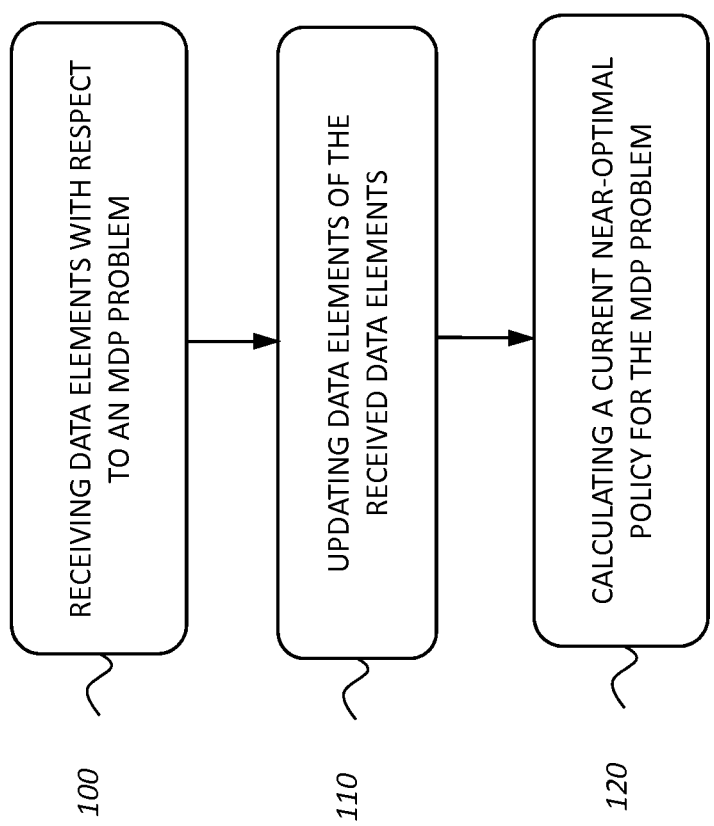
FIG. 1 shows a flowchart of a method for determining a variable near-optimal policy for a problem formulated as Markov Decision Process and including at least one limited action entry, constructed and operative in accordance with an embodiment of the disclosed techniques.

Determining variable near-optimal policy for a problem formulated as MDP paradigm is disclosed herein. A problem of optimization of complex entities is considered, where the optimization approach is infinite horizon, finite state space, and finite action set MDP.

The term "complex entities", as referred to herein, may relate to entities which may be described by processes, characterized by large number of parameters with frequently non-linear dependencies, and which may be expressed by a set of differential equations.

The disclosed methods, systems and computer program products may deal with additional requirements which involve updating the near-optimal policy during its execution, such as limitation of number of changes of the value of certain action entries during the entire process (i.e., limited action entries).

The existing MDP model may be then extended and an algorithm, which may be used to solve it, is herein disclosed. A main addition to the standard MDP model is that not all of the required data is known in advance (e.g., when the values of certain action entries with limited number of changes are actually changing). Each time a current near-optimal policy might be terminated due to newly received information, new data elements may be provided to the algorithm or updated. Such data elements may be a pair of an immediate cost function and a discount factor and/or a probability matrix. Following the change in the data elements, a new near-optimal policy may be calculated.

For example, providing of a new pair of immediate cost function and discount factor or updating these data elements may allow increasing penalty for the next change after every change of the value of the limited action entry. Furthermore, the discount factor may be an increasing function of the number of the limited action entries changes. For example, at the beginning of the policy application, the discount factor may be close to zero, while after all allowed changes are made, it may tend to one.

Thus, keeping infinite horizon model usage, a bounded gap to optimality (i.e., a gap between a received near-optimal solution and an optional solution), which may be controlled by the discount factor may be achieved. This, in addition to satisfaction of the requirement of specific (i.e., predefined) number of changes of the value of one or more action entries during the process.

The formal definition of MDP for infinite horizon, discounted cost, finite states and actions space is as follows. Discounted cost MDP is a 5-tuple $<S,U,P,c,\beta>$, where:

S is a finite set of states, $s=<s_1, s_2, \ldots, s_s>\in S$, where an element from S, i.e., a state, is a vector which includes state entries $s_s$;

U is a finite set of actions, $u=<u_1, u_2, \ldots, u_u>\in U$, where an element from U, i.e., an action u, is a vector, which includes action entries $u_u$;

P is a transition probabilities matrix, $P(s^j|s^i, u^k)\in[0,1]$, where $s^j, s^i \in S, u^k \in U$;

$c\in R^{|S|\cdot|U|}$ is an immediate cost function, where each value of the function is defined per a pair of: (state, action);

$s^t$ is a vector of random variables which represents state at time t; and $u^t$ is a vector of random variables which represents action at time t.

Expectation of cost at time t with policy: $\pi:S\rightarrow U$ is defined as:

$$E_t^\pi[c(s^t, u^t)] = \sum_{s \in S, u \in U} c(s, u) P_{s_0}^\pi(s^t = s, u^t = u)$$

For the discount cost model, where $0\le\beta<1$ is a discount factor, cost is defined as:

$$C(\pi) = (1 - \beta)\sum_{t=0}^{\infty} \beta^t E_t^\pi[c(s^t, u^t)]$$

The optimization problem may be defined as follows:
Given $<S, U, P, c, \beta>$ as defined above, find policy $\pi^*$ such that $C(\pi^*)$ is minimized.

Reference is now made to FIG. 1 which shows a flowchart of a method for determining a variable near-optimal policy for a problem formulated as Markov Decision Process and including at least one limited action entry, constructed and operative in accordance with an embodiment of the disclosed techniques.

In a step 100, data elements with respect to the MDP problem may be received. The data elements may include a finite set of states, a finite set of actions, a transition probabilities matrix, an immediate cost function and a discount factor. Thus, the received data elements may be a 5-tuple as follows: $<S, U, P, c, \beta>$. The transition probabilities matrix may determine transition probabilities between states of the finite set of states once actions of the set of actions are performed. For example, probability $P(s^j|s^i, u^k)$ determines the probability of transition from state $s^i$ to state $s^j$ once action $u^k$ is performed. Each value of the immediate cost function may be determined for a pair of a state and an action.

In a step 110, one or more data elements of the received data elements relating to the at least one limited action entry may be updated. The data elements may be the transition probabilities matrix, the immediate cost function and/or the discount factor. The updating may be triggered by the change of the value of a limited action entry. The updating may be performed multiple times during the process. The updating may include receiving, each time, an updated such 5-tuple (i.e., including one or more updated data elements) or by only receiving the updated data elements. Optionally, the updating may include calculating a current value for the data elements, as will be described herein below. The finite set of states, i.e., set S, and the finite set of actions, i.e., set U, may be received only once at time zero.

In some embodiments, the transition probabilities matrix, i.e., P, may remain unchanged. However, the immediate cost function, i.e., c, and/or the discount factor, i.e., $\beta$, may be changed, e.g., updated. Such a change may be triggered by changing the value of a limited action entry. The updating may then include increasing the cost for the next time the value of the action entry is changing and increasing the discount factor with respect to the number of times remained to change the value of the limited action entry. The received data elements may include indication with respect to the limited action entries, for example, such limited action entries may be flagged.

In some embodiments, the transition probabilities matrix may be changed. In such a case, the immediate cost function and the discount factor remain unchanged during the process. For example, once no further changes of the value of a limited action entry are allowed, elements of the transition probabilities matrix relating to the limited action entry may be removed. Thus, a further change of the value of the limited action entry may be prevented.

In a step 120, following the updating of the data elements, a current near-optimal policy for the problem may be calculated.

The disclosed techniques may be implemented as computer software or programs. The data elements for a specific problem may be received as input by the program, for example from a user of the program.

In some embodiments, the updating of the data elements may further include calculating a current value for the data elements to be updated. Exemplary equations for calculating the immediate cost function value and the discount factor as a function of the number of changes of the value of a limited action entry are disclosed herein below.

First, several definitions are introduced.

Let K>0 be a maximum number of times that an exemplary action entry $u_1$ of vector u may change its value. Let $T_k$ be the expected length of time between the k's change of the value of $u_1$ and the k's+1 change of the value of $u_1$. The determination of the expected length of time may be based on previous learning experience of the problem. The expected length of time may not be precise. Let $T=\Sigma_k T_k$ be the overall time that optimization is required. Let $a \in R^+$ be an auxiliary parameter such that, $$0 < \frac{1}{a} < 1.$$

Let r>1 be a fixed real number which may be used for updating the immediate cost function. r may be tuned per a problem. For example, r may be defined as follows:

$$r = \left(|S| \cdot |U| \cdot \max_{s,u}(c(s, u) + 1)^{\frac{1}{K}}\right) \text{ changes.}$$

Without loss of generality, it may be assumed that the problem is a minimization problem.

The k-th value of the discount factor $\beta$ and/or the immediate cost function c(s, u) may be defined to be used in the MDP problem formulation after the value of action entry $u_1$ has been changed k times.

$$\beta = a^{\left\{-\frac{1}{T_k}\right\}}$$

c(s, u)=c(s, u|$u_1 \neq 1$)+$r^{(k+1)}$//for all but the latest value of $u_1$. Let $u_1$=1 be the latest value of $u_1$. Thus, the value of the immediate cost function for $u_1$=1, $\forall$s is c(s, u|$u_1$=1).

Reference is now made to FIG. 2, which shows a flowchart of an exemplary method for applying a variable near-optimal policy for an MDP problem with limitation of the number of times the value of an action entry may be changed (referred to herein as action entry $u_1$), constructed and operative in accordance with an embodiment of the disclosed techniques. The method may be extended for arbitrary number of such actions with the required modifications.

In a step 200, data elements with respect to the MDP problem may be received, i.e., the 5-tuple: <S, U, P, c, $\beta$>.

In a step 210, an initial near-optimal policy $\pi$*(k=0) for the MDP problem may be calculated and then applied. The value of the variable k may be initialized, i.e., determined to be zero.

In a step 220, if the value of action entry $u_1$ is changed (i.e., the limited action entry) and k is smaller than K (k=0, 1, . . . K−1), the following steps may be performed. The k-condition is aimed to prevent the updating of the immediate cost function and the discount factor, and therefore changing the near-optimal policy, for a number of times which is beyond the number of times the value of the limited action entry may be changed (i.e., K times).

In a step 230, the value of the variable k may be increased by one to reflect the increase in the number of changes of the value of action entry $u_1$.

In a step 240, a current near-optimal policy $\pi$*(k) may be calculated and then applied. The calculating of the current near-optimal policy $\pi$*(k) may include calculating an updated value for the immediate cost function c and the discount factor $\beta$. After policy $\pi$*(k) is calculated it may be used until time $T_k$.

Steps 230 and 240 may be performed each time the value of the limited action entry is changed and until the maximum number of times that the value of the limited action entry may be changed, K, is reached.

A considerable question, which may arise, is how far a policy $\pi$*(k) is from the optimal one if a policy termination happens before the expected time $T_k$. It should be noted that when a termination time is smaller than expected, a better policy may exist. Assuming that $\pi$'(k) is the optimal policy for interval k when length of this interval is less than $T_k$, it may be proven that the objective obtained by policy $\pi$*(k) may be at most improved by $\beta \cdot \max_{s,u} c(s, u)$ by policy $\pi$'(k) for a time horizon less than $T_k$. Thus, in some embodiments, the discount factor may be used to control the bounded gap of a calculated current near-optimal policy to optimality.

A proof of the above may rely on two assumptions. The first assumption is that since $\beta$ is predefined, it may be defined such that after time $T_k$ the cost is negligible. Thus, one may assume that optimal policies for finite horizon $T_k$ and infinite horizon are equal. The second assumption is that all costs are bounded and non-negative (i.e., in order to address real industrial problems). It should be noted that an extension of the upper bound result to general cost is clear to one skilled in the art.

The proof may include two parts. In the first, an upper bound for the difference between objective function for partial time horizon and infinite time horizon may be proved and in the second part, the correctness of the claim may be shown.

An objective function value is upper bounded by $$GU = (1-\beta)\cdot\left(\frac{1}{1-\beta} - 1\right).$$

$\max_{s,u} c(s, u)$ for any horizon starting from time 1. This is from the reason that maximum value that may be obtained for any time is $\max_{s,u} c(s, u)$. An occupation measure of each state and action pair is upper bounded by one according to the definition, and for infinite horizon the maximum $$\frac{1}{1-\beta}$$

multiplier is achieved.

A worst case scenario may be considered, when the value of action entry $u_1$ is changed at the first sample ($T_k=1$). A new policy $\pi''(k)$ may be defined, which follows policy $\pi'(k)$ at t=0 and policy $\pi^*(k)$ afterward. This is while assuming that $\pi'(k)$ may improve objective by more than GU. Policy $\pi''(k)$ may be now applied instead of $\pi^*(k)$, for the original ($T_k$) problem. In the worst case scenario, this policy achieves $\max_s c(s)$ for all t>0 times while policy $\pi^*(k)$, at best, may achieve zero for these times. Namely, policy $\pi^*(k)$ improves $\pi''(k)$ for t>0 by GU at most. Since at time t=0 policy $\pi''(k)$ improves $\pi^*(k)$ by more than GU then policy $\pi''(k)$ improves policy $\pi^*(k)$ for $T_k$ original problem. Thus, a contradiction is reached since $\pi^*(k)$ is optimal.

It should be noted that since the values of the immediate cost function are bounded, the gap to optimality may be reduced as much as needed by the discount factor $\beta$. From practical considerations it may be unreasonable to choose $\beta$ to be equal to zero, in order to zero the gap, from the reason that the future needs to be considered as well.

An exemplary application of the disclosed techniques may be in operating plants which are not completely automated. A plant's operation may require performing specific actions in specific time frames according to the monitored state of various facilities, devices and/or materials used or found in the plant. For example, since man power may be limited, the operations performed by the personnel of the plant in a specific time frame may be limited. For example, such a problem may exist in wastewater treatment plants (WWTP). The state of blowers, chemicals quantities etc. (i.e., state entries) may be monitored per a time interval. Various actions may be required in order to operate the WWTP, such as operating blowers in a certain speed or adding a certain amount of chemicals (i.e., action entries). Accordingly, the value of an action entry of operating the blowers may reflect the blowers' speed or the value of an action entry of adding chemicals may reflect the amount of chemicals to be added. A change in these values may be required following a state input. The change may be applied by operations performed by the plant's personnel, such as changing the blowers speed or changing the amount of added chemicals. The cost as a result of operating such a plant may include the costs of electricity, sludge, gas, chemicals and the like. The problem may be to find an operating policy which will minimize the cost. The requirement may be that the plant's personnel may perform the required changes for a limited number of times per a time frame.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining a variable near-optimal policy for a problem formulated as Markov Decision Process, the problem comprising at least one limited action entry, the limited action entry being an entry of an action of a finite set of actions limited in the number of times its value may be changed, the method comprising using at least one hardware processor for:
   receiving data elements with respect to the problem, the data elements comprising:
   (a) a finite set of states, wherein each state of the states comprises state entries,
   (b) the finite set of actions, wherein each action of the actions comprises action entries,
   (c) a transition probabilities matrix determining transition probabilities between states of the finite set of states, once actions of the set of actions are performed;
   (d) an immediate cost function, wherein the value of the immediate cost function is determined for a pair of a state of the finite set of states and an action of the finite set of actions, and
   (e) a discount factor;
   updating one or more data elements of the received data elements relating to the at least one limited action entry, wherein the one or more data elements are selected from the group consisting of: the transition probabilities matrix, the immediate cost function and the discount factor, and wherein the updating is triggered by a change in a value of a limited action entry of the at least one limited action entry; and
   following the updating of the one or more data elements, calculating a current near-optimal policy for the problem based on the updated one or more data elements.

2. The method of claim 1, wherein the updating of the one or more data elements comprises updating the immediate cost function.

3. The method of claim 2, wherein the updating of the immediate cost function comprises increasing a value of the immediate cost function determined for the limited action entry, for the next time the value of the limited action entry is changed.

4. The method of claim 1, wherein the updating of the one or more data elements comprises updating the discount factor.

5. The method of claim 4, wherein the updating of the discount factor comprises increasing the discount factor with respect to the number of times remained to change the value of the limited action entry.

6. The method of claim 1, wherein the updating of the one or more data elements comprises updating the transition probabilities matrix.

7. The method of claim 1, wherein the updating of the one or more data elements comprises calculating a current value for the one or more data elements.

8. The method of claim 1, further comprising using said at least one hardware processor for preventing the updating of the one or more data elements for a number of times which is beyond the number of times the value of the limited action entry may be changed.

9. The method of claim 1, wherein the discount factor is used to control a bounded gap of the calculated current near-optimal policy to optimality.

10. A computer program product for determining a variable near-optimal policy for a problem formulated as Markov Decision Process, the problem comprising at least one limited action entry, the limited action entry being an entry of an action of a finite set of actions limited in the number of times its value may be changed, the computer program product comprising a non-transitory computer-readable storage medium having program code embodied therewith, the program code executable by at least one hardware processor to:

receive data elements with respect to the problem, the data elements comprising:
(a) a finite set of states,
(b) the finite set of actions,
(c) a transition probabilities matrix determining transition probabilities between states of the finite set of states, once actions of the set of actions are performed;
(d) an immediate cost function, wherein the value of the immediate cost function is determined for a pair of a state of the finite set of states and an action of the finite set of actions, and
(e) a discount factor;

update one or more data elements of the received data elements relating to the at least one limited action entry, wherein the one or more data elements are selected from the group consisting of: the transition probabilities matrix, the immediate cost function and the discount factor, and wherein the updating is triggered by a change of a value of a limited action entry of the at least one limited action entry; and following the updating of the one or more data elements, calculate a current near-optimal policy for the problem based on the updated one or more data elements.

11. The computer program product of claim 10, wherein the updating of the one or more data elements comprises updating the immediate cost function.

12. The computer program product of claim 11, wherein the updating of the immediate cost function comprises increasing a value of the immediate cost function determined for the limited action entry, for the next time the value of the limited action entry is changed.

13. The computer program product of claim 10, wherein the updating of the one or more data elements comprises updating of the discount factor.

14. The computer program product of claim 12, wherein the updating of the discount factor comprises increasing the discount factor with respect to the number of times remained to change the value of the limited action entry.

15. The computer program product of claim 10, wherein the updating of the one or more data elements comprises updating the transition probabilities matrix.

16. The computer program product of claim 10, wherein the updating of the one or more data elements comprises calculating a current value for the one or more data elements.

17. The computer program product of claim 10, wherein said program code is further executable by said at least one hardware processor to prevent the updating of the one or more data elements for a number of times which is beyond the number of times the value of the limited action entry may be changed.

18. The computer program product of claim 10, wherein the discount factor is used to control a bounded gap of the calculated current near-optimal policy to optimality.

19. A system comprising at least one hardware processor configured to:

receive data elements with respect to the problem, the data elements comprising:
(a) a finite set of states,
(b) the finite set of actions,
(c) a transition probabilities matrix determining transition probabilities between states of the finite set of states, once actions of the set of actions are performed;
(d) an immediate cost function, wherein the value of the immediate cost function is determined for a pair of a state of the finite set of states and an action of the finite set of actions, and
(e) a discount factor;

update one or more data elements of the received data elements relating to the at least one limited action entry, wherein the one or more data elements are selected from the group consisting of: the transition probabilities matrix, the immediate cost function and the discount factor, and wherein the updating is triggered by a change of a value of a limited action entry of the at least one limited action entry; and following the updating of the one or more data elements, calculate a current near-optimal policy for the problem based on the updated one or more data elements.

20. The system of claim 19, wherein the updating of the one or more data elements comprises calculating a current value for the one or more data elements.

* * * * *